(12) United States Patent
Olsen (10) Patent No.: US 8,856,336 B2
(45) Date of Patent: Oct. 7, 2014

(54) MOVING A PARTITION BETWEEN COMPUTERS

(75) Inventor: Paul F. Olsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 13/211,098

(22) Filed: Aug. 16, 2011

(65) Prior Publication Data

US 2013/0046891 A1 Feb. 21, 2013

(51) Int. Cl.
- *G06F 15/173* (2006.01)
- *G06Q 10/00* (2012.01)
- *G06F 9/46* (2006.01)
- *G06F 9/06* (2006.01)
- *G06Q 30/00* (2012.01)

(52) U.S. Cl.
CPC . *G06Q 30/00* (2013.01); *G06F 9/06* (2013.01)
USPC .............. 709/226; 718/100; 718/104; 705/30

(58) Field of Classification Search
None
See application file for complete search history.

(56) References Cited

U.S. PATENT DOCUMENTS

2002/0166117 A1* 11/2002 Abrams et al. ................ 717/177

* cited by examiner

*Primary Examiner* — Ranodhi Serrao (74) *Attorney, Agent, or Firm* — Owen J. Gamon; Roy W. Truelson (57) ABSTRACT

In an embodiment, a request is received that requests to move a first partition from a source computer to a destination computer. In response to the request, charging is halted for a resource used by the first partition at the source computer while the first partition is executing at the source computer. In response to the request, a resource is allocated to a second partition at the destination computer. In response to the request, use of the resource is charged at the destination computer. In response to the request, execution of the second partition is started at the destination computer.

17 Claims, 5 Drawing Sheets

320-1
SERVER INFORMATION

| SOURCE COMPUTER | | | | TIME | DESTINATION COMPUTER | | | |
|---|---|---|---|---|---|---|---|---|
| RSC IDS (345-1) | ENTITLED (350-1) | CHARGE TYPE (355-1) | TIME LIMIT (360-1) | | RSC IDS (345-2) | ENTITLED (350-2) | CHARGE TYPE (355-2) | TIME LIMIT (360-2) |
| RSC C | YES | YES | NONE | T1 | RSC D | NO | NO | NONE |
| RSC C | TEMP | NO | 1 MIN | T2 | RSC D | YES | YES | NONE |
| RSC C | NO | NO | NONE | T3 | RSC D | YES | YES | NONE |

MOVING A PARTITION BETWEEN COMPUTERS

FIELD

An embodiment of the invention generally relates to computer systems and more particularly to resource capacity on demand in computer systems.

BACKGROUND

Computer systems typically comprise a combination of computer programs and hardware, such as semiconductors, transistors, chips, circuit boards, cards, storage devices, and processors, which are referred to as resources. The computer programs are stored in the storage devices and are executed by the processors.

Computer resource requirements for business and government applications often increase over a time period due to sales growth. Yet, over the same time period, the resource requirements may fluctuate significantly due to the inevitable peaks and valleys of day-to-day operations or from the increased loads for seasonal, period-end, or special promotions. Thus, the peak resource requirements within a time period may be dramatically more than the valley resource requirements. Hence, in order to be effective, the computerized resources of a business must be sufficient to meet the current fluctuating needs of the business, as well as projected needs due to growth.

When faced with these fluctuating and ever-increasing resource demands, a customer often needs to purchase computing resources capable of accommodating at least the peak requirements while planning for future requirements, which are almost certain to be elevated. As a result, customers face the prospect of investing in more computerized resources than are immediately needed in order to accommodate growth and operational peaks and valleys. Thus, at a given time, the customer may have excess computing capacity, which is a very real cost. Such costs can represent a major, if not preclusive, expenditure for the customer, who may have insufficient capital or time to react to rapid growth and fluctuating requirements.

To address this problem, computing architectures such as a capacity on demand design, allow customers to effectively rent or lease resources on an as-needed or on-demand basis. More particularly, customers may temporarily enable standby resources that are initially dormant or unused within their machine. Where desired, the standby resources are not included in the up-front, baseline cost of the machine. As such, for a relatively smaller initial capital investment, a customer may activate and deactivate standby or on-demand resources as needed for a fee, which provides the customer with customized access and optimized usage.

SUMMARY

A method, computer-readable storage medium, and computer system are provided. In an embodiment, a request is received that requests to move a first partition from a source computer to a destination computer. In response to the request, charging is halted for a resource used by the first partition at the source computer while the first partition is executing at the source computer, a resource is allocated to a second partition at the destination computer, use of the resource is charged at the destination computer, and execution of the second partition is started at the destination computer.

It is to be noted, however, that the appended drawings illustrate only example embodiments of the invention, and are therefore not considered a limitation of the scope of other embodiments of the invention.

DETAILED DESCRIPTION

Figure 1:
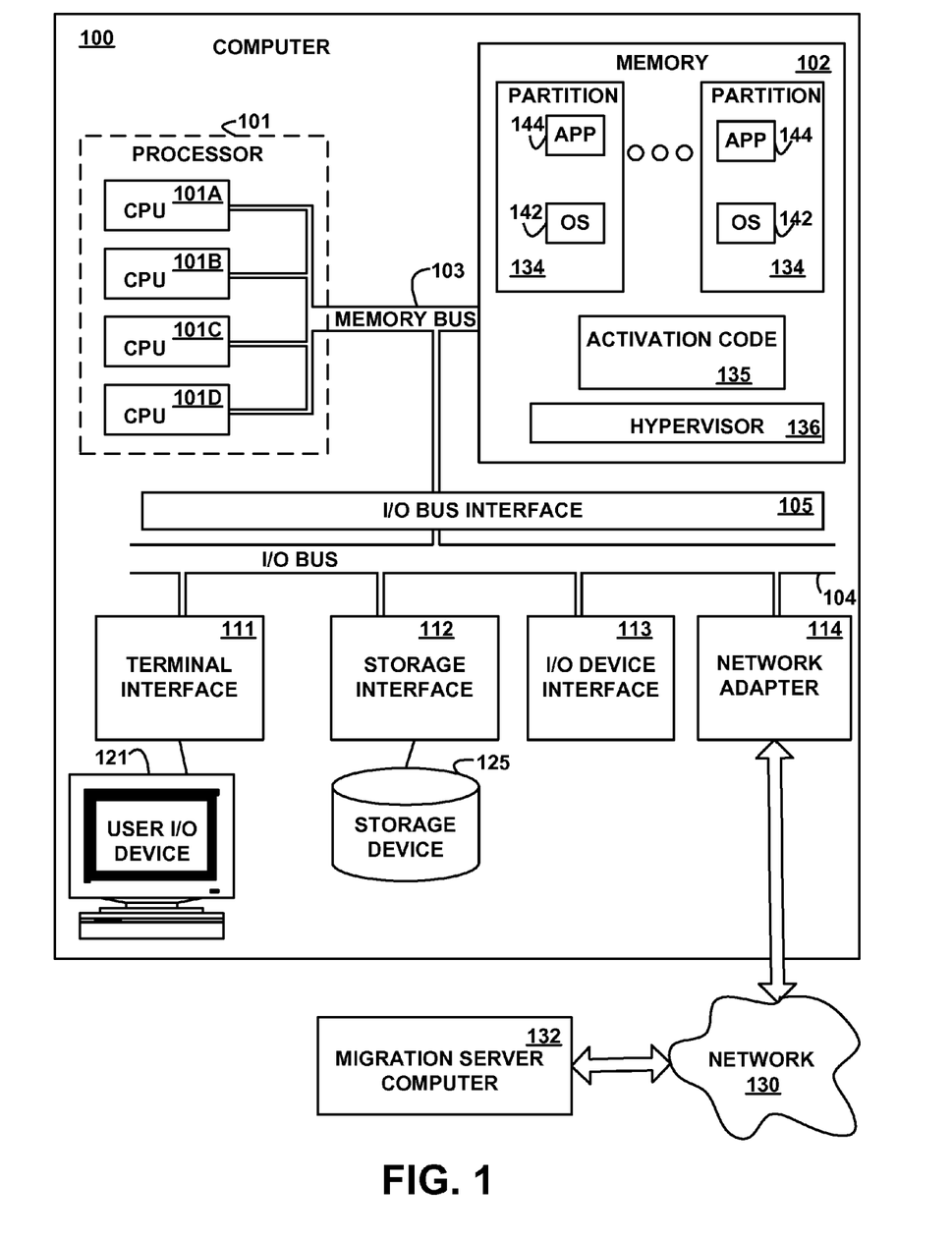
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a migration server computer system 132 via a network 130, according to an embodiment of the present invention. The terms "server" and "migration server" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary components utilized in implementing a logically partitioned computing environment on the computer 100, including a plurality of logical partitions 134 managed by a partition manager or hypervisor 136, and an activation code or codes 135. Although the partitions 134, the activation code 135, and the hypervisor 136 are illustrated as being contained within the memory 102 in the computer system 100, in other embodiments some or all of them may be on different computer systems, e.g., the migration server computer 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134, the activation code 135, and the hypervisor 136 are illustrated as residing in the memory 102, these elements are not necessarily all completely contained in the same storage device at the same time.

Each of the logical partitions 134 comprises and utilizes an OS (operating system) 142, which controls the primary operations of the logical partition 134 in the same manner as the operating system of a non-partitioned computer. Some or all of the operating systems 142 may be the same or different from each other. Any number of logical partitions 134 may be supported as is well known in the art, and the number of the logical partitions 134 resident at any time in the computer 100 may change dynamically as partitions are added or removed from the computer 100.

Each of the logical partition 134 comprises instructions that execute on the processor 101 in a separate, or independent, memory space, and thus each logical partition 134 acts much the same as an independent, non-partitioned computer from the perspective of each application (app) 144 that executes in each such logical partition. As such, the applications 144 typically do not require any special configuration for use in a partitioned environment. In various embodiments, the application 144 is a user application, a third-party application, or any portion, multiple, or combination thereof. The application 144 comprises instructions that execute on the processor 101 or statements are interpreted by instructions that execute on the processor 101.

Given the nature of logical partitions 134 as separate virtual computers, it may be desirable to support inter-partition communication to permit the logical partitions to communicate with one another as if the logical partitions were on separate physical machines. As such, in some implementations it may be desirable to support an unillustrated virtual local area network (LAN) adapter associated with the hypervisor 136 to permit the logical partitions 134 to communicate with one another via a networking protocol. In another embodiment, the virtual network adapter may bridge to a physical adapter, such as the network adapter 114. Other manners of supporting communication between partitions 134 may also be supported consistent with embodiments of the invention.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting the partitions 134, concurrent I/O maintenance, and allocating/deallocating processors, memory and other hardware or program resources to/from the various partitions 134.

In an embodiment, the hypervisor 136 includes instructions that execute on the processor 101 or statements that are interpreted by instructions executing on the processor 101 to perform the functions as further described below with reference to FIGS. 2, 3, 4, and 5. In another embodiment, the hypervisor 136 may be implemented in microcode or firmware. In another embodiment, the hypervisor 136 may be implemented in hardware via logic gates and/or other appropriate hardware techniques.

The hypervisor 136 statically and/or dynamically allocates to each logical partition 134 a portion of the available resources in the computer 100. For example, each logical partition 134 may be allocated one or more of the processors 101 and/or one or more hardware threads on which to execute, as well as a portion of the available memory space to access. The logical partitions 134 can share specific program and/or hardware resources such as the processors 101, such that a given resource may be utilized by more than one logical partition 134. In the alternative, program and hardware resources may be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions 134 sharing resources on the same bus. Some resources may be allocated to multiple logical partitions 134 at a time. The resources identified herein are examples only, and any appropriate resource capable of being allocated may be used.

The hypervisor 136 uses the activation code 135 to activate a resource or resources (previously described above) that are present at the computer system 100, but dormant or not used, so that the resource may be used and allocated to one or more of the partitions 134. In another embodiment, the hypervisor 136 or other capacity manager may activate resources for a network of connected computers.

In an embodiment, the activation code 135 is unique and configured for use only on a particular machine (e.g., the computer 100), but in other embodiments the activation code 135 may be used across multiple machines. The activation code 135 may include a resource-time value. The resource-time value generally provides information that identifies a resource, optionally a quantity of that resource that is available for use, and optionally a time period for which the quantity is available for use.

As a particular example, a resource-time value may specify a number of processors and a time period for which the processors may be used. Where the time period is given in days (a day being a 24 hour period), for example, the product of these values is a number of processors-days. More generally, the resource component of a resource-time value may be any resource (e.g., of the computer 100) capable of being made selectively available according to request. In addition, the quantity of the resource specified by the activation code 135 may be a whole number or a fraction.

The hypervisor 136 may receive the activation code 135 from the migration server computer 132. The hypervisor 136 may optionally verify the activation code 135 to determine if the activation code 135 is configured for the computer(s) for which the hypervisor 136 has responsibility. The hypervisor 136 then allocates, activates, enables, or unlocks the selected resource or resources associated with or controlled by the activation code 135.

In an embodiment, activating resources by the hypervisor 136 operates to place the resources into service (i.e., to perform their designated functions such as processing or storing, depending upon the resource), optionally for a period of time, for use by some or all of the partitions 134 executing at the computer 100. In another embodiment, activating the resources does not place the resources into service, but merely makes the resources available for request by a user or a partition 134. That is, in an embodiment, activating the resources unlocks the resources, so that a user can assign them a task, but does not automatically give control of the resources to the operating system(s) 142. In this respect, the user may be given flexibility in the manner in which the resource-time value is used. For example, the resource-time value may define a usage limit which may be reached by specifying any variety of resource quantity values and time values, so long as the sum of the products of the specified quantity values and time values does not exceed the usage limit. In this way, multiple resource requests may be made for capacity based on a single activation code 135, so long as the sum of the products of the specified quantity values and time values is equal to or less than the usage limit value specified by the resource-time value of a particular activation code 135.

Regardless of the manner in which resources are placed into service, the duration for which the resources are in use (or at least available to be used if needed during continued operation of the system) may be permanent or temporary, according to a specified time limit. Once the specified time limit expires, the hypervisor 136 reclaims the temporary resources and deactivates or disables them from further use by any partition 134. They hypervisor 136 may re-activated the same resources at a later time.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O interface units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the migration server computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The migration server computer system 132 may comprise any, some, or all of the hardware and/or computer program elements of the computer system 100.

FIG. 1 is intended to depict the representative major components of the computer system 100, the network 130, and the migration server computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
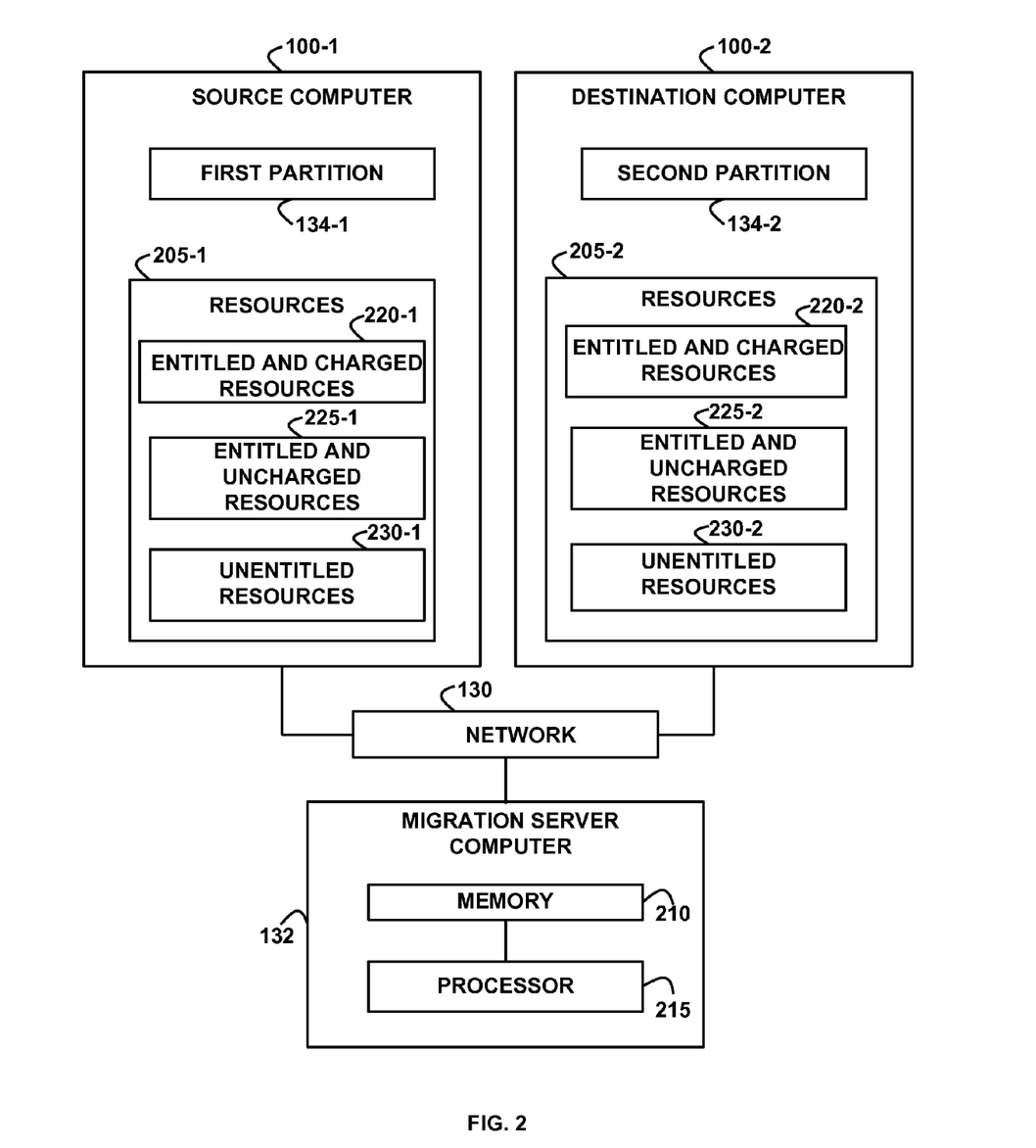
FIG. 2 depicts a block diagram of an example network of computer systems for implementing an embodiment of the invention.

FIG. 2 depicts a block diagram of an example source computer system 100-1, an example destination computer system 100-2, and an example migration server computer system 132 connected via the network 130, according to an embodiment of the invention. The source computer system 100-1 and the destination computer system 100-2 are examples of, an are generically referred to by, the computer system 100 (FIG. 1).

The source computer 100-1 comprises a first partition 134-1 and resources 205-1. The destination computer 100-2 comprises a second partition 134-2. The first partition 134-1 and the second partition 134-2 are examples of, and are generically referred to by, the partitions 134 (FIG. 1). In an embodiment, the first partition 134-1 at the source computer 100-1 and the second partition 134-2 at the destination computer 100-2 comprise identical instructions. In an embodiment, the first partition 134-1 at the source computer 100-1 and the second partition 134-2 at the destination computer 100-2 comprise different instructions.

Referring again to FIG. 2, in an embodiment, the resources 205-1 and 205-2 represent one or more of the processors 101, one or more hardware threads of the processors 101, a portion or all of the memory 102, a portion or all of the storage devices 125, the I/O adapters 111, 112, 113, or 114, network bandwidth, or any other resource, component, element, or device capable of being allocated to, assigned to, or used by a partition 134. The resources 205-1 and 205-2 may comprise any some or all of entitled and charged resources 220-1 and 220-2, entitled and uncharged resources 225-1 and 225-2, and unentitled resources 230-1 and 230-2, respectively.

An entitled resource is a resource that is licensed for use by a partition 134-1 or 134-2 at the computer 100-1 or 100-2, respectively, that is available for use or allocation by the hypervisor 136 (FIG. 1) to a partition 134-1 or 134-2 at the computer 100-1 or 100-2, or that is allocated to and in use by a partition 134-1 or 134-1. An unentitled resource 230-1, 230-2 is a resource that is physically present at the computer 100-1 or 100-2 but that the computer 100-1 or 100-2 or the partitions 134-1, 134-2 at the computers 100-1, 100-2 are not entitled to use, are not licensed to use, or are not capable of using.

A charged resource is a resource that the migration server computer 132 has charged or billed to the customer or user of the computer 100-1 or 100-2 or the partition 134-1 or 134-2 or is charging or billing to the customer or user. The migration server computer 132 may charge the customer by sending a bill to the customer, by deducting money from a deposit account, bank account, or other account of the customer, by charging a credit card account of the customer, or by an other appropriate means of receiving money or requesting money from the customer. A uncharged resource is a resource at the computer 100-1 or 100-2, for which the customer is not charged.

An entitled and charged resource 220-1, 220-2 is a recourse that the customer is both entitled to use and for which use the customer is charged. An entitled and uncharged resource 225-1, 225-2 is a resource that the customer uses or is entitled to use, but for which the customer is not charged.

The migration server computer comprises memory 210 connected to a processor 215. The memory 210 is analogous to the memory 102 (FIG. 1), and the processor 215 is analogous to the processor 101 (FIG. 1).

Figure 3:
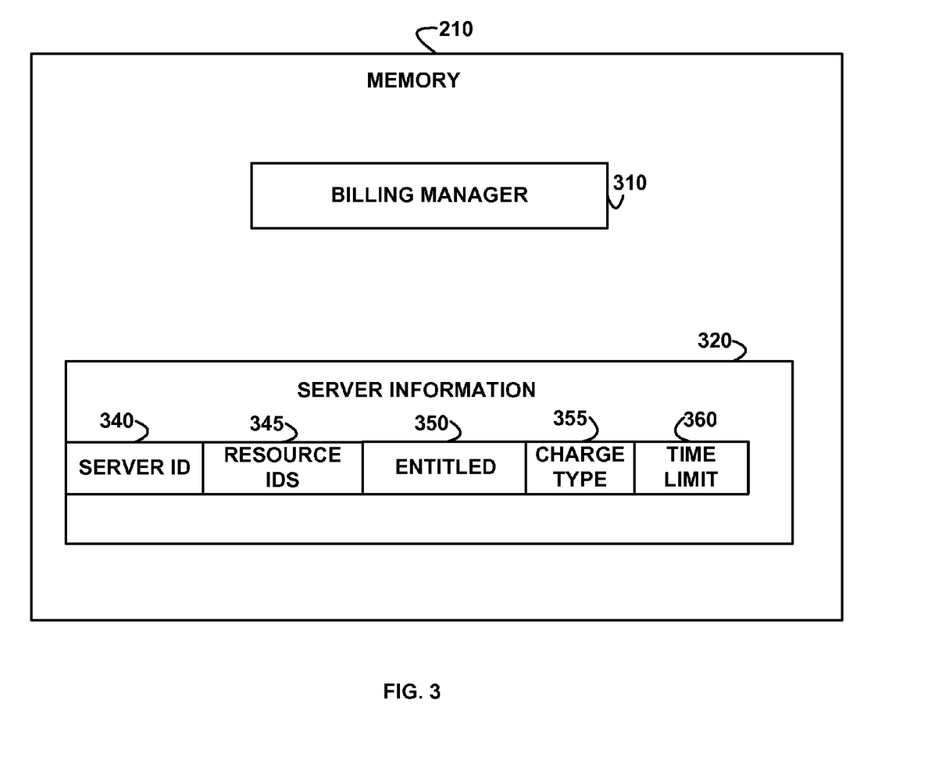
FIG. 3 depicts a block diagram of example memory, according to an embodiment of the invention.

FIG. 3 depicts a block diagram of example memory 210, according to an embodiment of the invention. The memory 210 stores a billing manager 310 and server information 320. The billing manager 310 comprises instructions that execute on the processor 215 (FIG. 2) or statements are interpreted by instructions that execute on the processor 215 to carry out the functions as further described below with reference to FIGS. 4 and 5. In another embodiment, the billing manager 310 may be implemented in microcode or firmware. In another embodiment, the billing manager 310 may be implemented in hardware via logic gates and/or other appropriate hardware techniques.

The server information 320 comprises a server identifier (ID) field 340, a resource identifiers field 345, an entitled indicator field 350, a charge type field 355, and a time limit field 360. In an embodiment, the server information 320 may comprise any number of entries, each entry comprising the server identifier field 340, the resource identifiers field 345, the entitled indicator field 350, the charge type field 355, and the time limit field 360.

The server identifier 340 identifies a computer system, such as the source computer 100-1 or the destination computer 100-2 (FIG. 2). The resource identifiers 345 identify the resources 205-1 or 205-2, such as the entitled and charged resources 220-1, 220-2, the entitled and uncharged resources 225-1, 225-2, or the unentitled resources 230-1, 230-2 at the computer 100 identified by the server identifier 340 in the same entry.

The entitled indicator 350 indicates whether or not a partition 134 at the computer 100 identified by the server identifier 340 in the same entry is entitled to use the resources identified by the resource identifiers 345 in the same entry. The charge type 355 specifies whether or not the customer is to be charged for use of the resources identified by the resource identifiers 345 in the same entry. The time limit 360 specifies a time period, if any, that a partition 134 at the computer 100 identified by the server identifier 340 in the same entry is entitled to use the resources identified by the resource identifiers 345 in the same entry.

Figure 4:
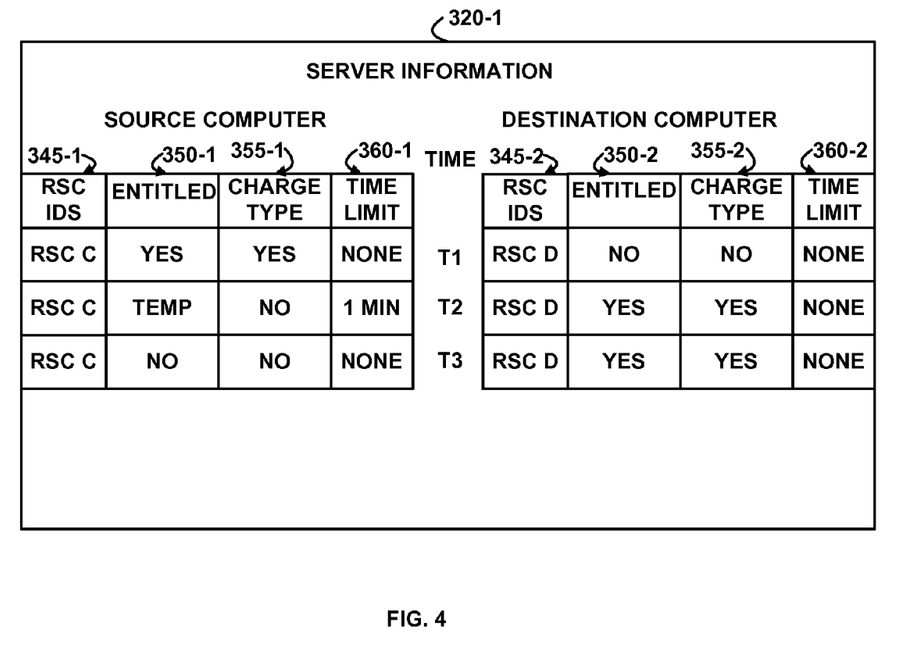
FIG. 4 depicts a block diagram of an example data structure for server information, according to an embodiment of the invention.

FIG. 4 depicts a block diagram of an example data structure for server information 320-1, according to an embodiment of the invention. The server information 320-1 is an example of the server information 320 (FIG. 3) for a source computer and a destination computer at times t1, t2, and t3. The server information 320-1 comprises an example resource (RSC) identifiers field 345-1, an example entitled indicator field 350-1, an example charge type field 355-1, an example time limit field 360-1, an example resource (RSC) identifiers field 345-2, an example entitled indicator field 350-2, an example charge type field 355-2, and an example time limit field 360-2.

The resource identifiers field 345-1 comprises example values of the resource identifiers field 345 for the source computer 100-1 at the times t1, t2 and t3. The example entitled indicator field 350-1 comprises example values of the entitled indicator field 350 for the source computer 100-1 at the times t1, t2, and t3. The example charge type field 355-1 comprises example values of the charge type field 355 for the source computer 100-1 at the times t1, t2, and t3. The example time limit field 360-1 comprises example values of the time limit field 360 for the source computer 100-1 at the times t1, t2, and t3.

The example resource identifiers field 345-2 comprises example values of the resource identifiers field 345 for the destination computer 100-2 at the times t1, t2 and t3. The example entitled indicator field 350-2 comprises example values of the entitled indicator field 350 for the destination computer 100-2 at the times t1, t2, and t3. The example charge type field 355-2 comprises example values of the charge type field 355 for the destination computer 100-2 at the times t1, t2, and t3. The example time limit field 360-2 comprises example values of the time limit field 360 for the destination computer 100-2 at the times t1, t2, and t3.

As illustrated in FIG. 4, at the time t1, the resources identified by the resource identifier of "RSC C" are entitled to be used by a partition 134 at the source computer 100-1, the use of the resources "RSC C" is being charged to the customer, and the use of the resources "RSC C" has no time limit. Also at the time t1, the resources identified by the resource identifier of "RSC D" are not entitled to be used by any partition 134 at the destination computer 100-2 and the use of the resources "RSC D" is not being charged to the customer (the resources are free of charge).

Subsequent to the time t1 and prior to the time t2, a request is sent to the migration server computer 132, which requests that a partition 134 at the source computer 100-1 be migrated to the destination computer 100-2. In response to the request, the migration server computer 132 changes the server information for the source computer 100-1 to be as illustrated in the server information 320-1 at the time t2, with the resources "RSC C" being temporarily entitled with a time limit of one minute, and the customer is not charged for the use of the resources "RSC C" at the source computer 100-1. Also in response to the request, the migration server computer 132 changes the server information for the destination computer 100-2 to be as illustrated in the server information 320-1 at the time 2, with the resources "RSC D" being entitled to be used by a partition 134 executing at the destination computer 100-2, and the use of the resources "RSC D" is charged to the customer.

At the time t3, which is subsequent to the time t2, the migration server computer 132 has changed the server information to indicate that the resources "RSC C" are no longer entitled at the source computer 100-1.

Figure 5:
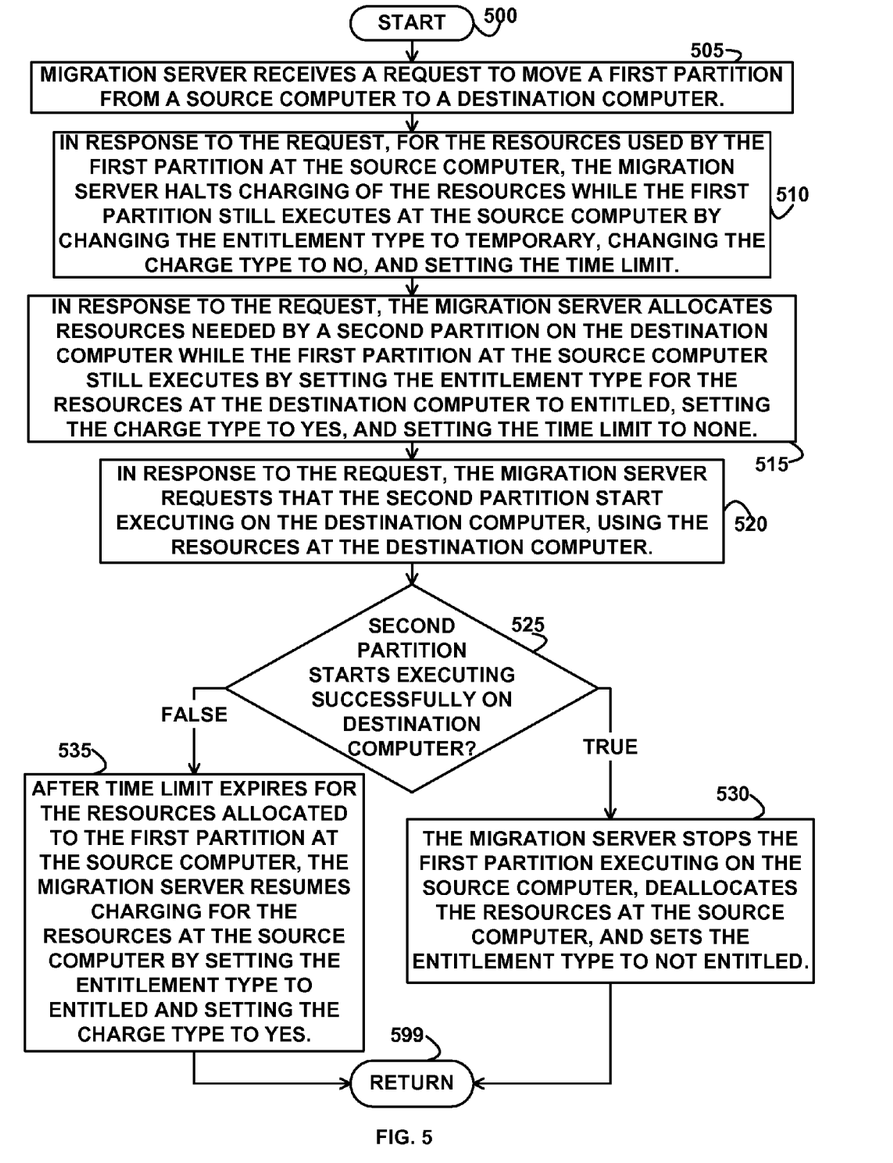
FIG. 5 depicts a flowchart of example processing for implementing an embodiment of the invention.

FIG. 5 depicts a flowchart of example processing for implementing an embodiment of the invention. Control begins at block 500. Control then continues to block 505 where the migration server computer 132 receives a request to move a first partition 134-1 that is executing at a source computer 100-1 from the source computer 100-1 to a destination computer 100-2. The migration server computer 132 may receive the request from a user, customer, administrator, partition 134, or hypervisor 136 at the migration server computer 132, at the source computer 100-1, at the destination computer 100-2, or from any electronic device connected to the network 130.

Control then continues to block 510 where, in response to the request, for the resources used by the first partition 134-1 at the source computer 100-1, the migration server computer 132 halts charging of the resources while the first partition 134-1 still executes at the source computer 100-1 by changing the entitled indicator 350 to indicate that the resources are temporarily entitled, by changing the charge type 355 to indicate that the customer is not to be charged for use of the temporarily entitled resources, and setting the time limit 360 to indicate a time duration value during which the customer may use the temporarily entitled resources without charge.

Control then continues to block 515 where, in response to the request, the migration server computer 132 allocates resources needed by a second partition 134-2 on the destination computer 100-2 while the first partition 134-1 at the source computer 100-1 still executes by setting the entitled indicator 350 for the resources at the destination computer 100-2 to indicate that the customer is entitled to use the resources, by setting the charge type 355 to indicate that the customer is to be charged for using the resources, and by setting the time limit 360 for the use of the resources to indicate that there is no time limit. In an embodiment, the amount and type of the resources at the destination computer 100-2 are the same amount and type as the resources used by the first partition 134-1 at the source computer 100-1. For example, if the resources at the source computer 100-1 allocated to the first partition 134-1 are processors, then resources at the destination computer 100-2 allocated to the second partition 134-2 are also processors, of the same number and speed.

Control then continues to block 520 where, in response to the request, the migration server computer 132 requests that the second partition 134-2 start executing on the destination computer 100-2, using the resources at the destination computer 100-2, previously allocated above at block 515.

Control then continues to block 525 where, the migration server computer 132 determines whether the second partition 134-2 has started executing successfully on the destination computer 100-2. In an embodiment, the migration server computer 132 makes the determination of block 525 by reading a response to the request previously sent at block 520 from the destination computer 100-2 and determining whether the response indicates that the second partition 134-2 started executing successfully. If the determination at block 525 is true, then the second partition 134-2 has started executing successfully on the destination computer 100-2, so control continues to block 530 where the migration server computer 132 stops the first partition 134-1 from executing on the source computer 100-1, deallocates the resources at the source computer 100-1 that are allocated to the first partition 134-1, and sets the entitled indicator 350 to indicate that the resources that were allocated to the first partition 134-1 are no longer allocated.

Control then continues to block 599 where the logic of FIG. 5 returns.

If the determination at block 525 is false, then start of the execution of the second partition 134-2 on the destination computer 100-2 was unsuccessful, so control continues to block 535 where, in response to the expiration of the time limit 360 for the resources allocated to the first partition 134-1 at the source computer 100-1, the migration server computer 132 resumes charging for the resources at the source computer 100-1 used by the first partition 134-1 by setting the entitled indicator 350 to indicate that the customer is entitled to use the resources and by setting the charge type 355 to indicate that the customer is to be charged for using the resources. In another embodiment, the migration server computer 132 deallocates the resources allocated to the first partition 134-1 at the source computer 100-1 in response to the expiration of the time limit 360 without first determining whether the second partition 134-2 has started executing successfully at the destination computer 100-2.

Control then continues to block 599 where the logic of FIG. 5 returns.

In this way, in an embodiment, a partition is migrated between computers without double charging the customer and without unnecessary error or warning messages to the customer.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
    receiving a request to move a first partition from a source computer to a destination computer while the first partition is executing on the source computer, said first partition using a fee-based first resource to perform work on behalf of at least one user;
    in response to the request, halting charging for the first resource used by the first partition at the source computer, wherein the first partition continues to execute using the first resource to perform work on behalf of the at least one user after halting charging for the first resource and wherein continued execution using the first resource is limited to a predetermined time limit after halting charging for the first resource;
    in response to the request, allocating a fee-based second resource to a second partition at the destination computer for performing work on behalf of the at least one user, wherein said allocating a fee-based second resource to a second partition is performed while the first partition continues to execute using the first resource to perform work on behalf of the at least one user after halting charging for the first resource;
    in response to the request, charging for the second resource at the destination computer; and
    in response to the request, starting execution of the second partition at the destination computer.

2. The method of claim 1, wherein the second partition is not executing at the destination computer at a time of the allocating.

3. The method of claim 1, further comprising:
    if the starting the execution of the second partition at the destination computer is unsuccessful, resuming charging for the first resource the source computer.

4. The method of claim 1, further comprising:
    if the starting the execution of the second partition at the destination computer is successful, stopping the executing of the first partition at the source computer and deallocating the first resource used by the first partition at the source computer.

5. The method of claim 1, further comprising:
    if the starting the execution of the second partition at the destination computer is unsuccessful, resuming charging for the first resource at the source computer after the time limit expires.

6. The method of claim 1, wherein the starting the execution of the second partition at the destination computer further comprises:
    sending a request from a migration server computer to the destination computer.

7. The method of claim 1, wherein the first partition and the second partition comprise identical instructions.

8. A non-transitory computer-readable storage medium encoded with instructions, wherein the instructions when executed comprise:
    receiving a request to move a first partition from a source computer to a destination computer while the first partition is executing on the source computer, said first partition using a fee-based first resource to perform work on behalf of at least one user;
    in response to the request, halting charging for the first resource used by the first partition at the source computer, wherein the first partition continues to execute using the first resource to perform work on behalf of the at least one user after halting charging for the first resource and wherein continued execution using the first resource is limited to a predetermined time limit after halting charging for the first resource;
    in response to the request, allocating a fee-based second resource to a second partition at the destination computer for performing work on behalf of the at least one user, wherein said allocating a fee-based second resource to a second partition is performed while the first partition continues to execute using the first resource to perform work on behalf of the at least one user after halting charging for the first resource, wherein the first partition and the second partition comprise identical instructions;
    in response to the request, charging for the second resource at the destination computer; and in response to the request, starting execution of the second partition at the destination computer, wherein the starting the execution of the second partition at the destination computer further comprises sending a request from a migration server computer to the destination computer.

9. The non-transitory computer-readable storage medium of claim 8, wherein the second partition is not executing at the destination computer at a time of the allocating.

10. The non-transitory computer-readable storage medium of claim 8, further comprising:
   if the starting the execution of the second partition at the destination computer is unsuccessful, resuming charging for the first resource the source computer.

11. The non-transitory computer-readable storage medium of claim 8, further comprising:
   if the starting the execution of the second partition at the destination computer is successful, stopping the executing of the first partition at the source computer and deallocating the first resource used by the first partition at the source computer.

12. The non-transitory computer-readable storage medium of claim 8, further comprising:
   if the starting the execution of the second partition at the destination computer is unsuccessful, resuming charging for the first resource at the source computer after the time limit expires.

13. A migration server computer comprising:
   a processor; and
   memory communicatively coupled to the processor, wherein the memory is encoded with instructions, and wherein the instructions when executed on the processor comprise
      receiving a request to move a first partition from a source computer to a destination computer while the first partition is executing on the source computer, said first partition using a fee-based first resource to perform work on behalf of at least one user,
      in response to the request, halting charging for the first resource used by the first partition at the source computer, wherein the first partition continues to execute using the first resource to perform work on behalf of the at least one user after halting charging for the first resource and wherein continued execution using the first resource is limited to a predetermined time limit after halting charging for the first resource,
      in response to the request, allocating a fee-based second resource to a second partition at the destination computer for performing work on behalf of the at least one user, wherein said allocating a fee-based second resource to a second partition is performed while the first partition continues to execute using the first resource to perform work on behalf of the at least one user after halting charging for the first resource, wherein the first partition and the second partition comprise identical instructions,
      in response to the request, charging for the second resource at the destination computer, and
      in response to the request, starting execution of the second partition at the destination computer, wherein the starting the execution of the second partition at the destination computer further comprises sending a request from the migration server computer to the destination computer.

14. The migration server computer of claim 13, wherein the second partition is not executing at the destination computer at a time of the allocating.

15. The migration server computer of claim 13, wherein the instructions further comprise:
   if the starting the execution of the second partition at the destination computer is unsuccessful, resuming charging for the first resource the source computer.

16. The migration server computer of claim 13, wherein the instructions further comprise:
   if the starting the execution of the second partition at the destination computer is successful, stopping the executing of the first partition at the source computer and deallocating the first resource used by the first partition at the source computer.

17. The migration server computer of claim 13, wherein the instructions further comprise:
   if the starting the execution of the second partition at the destination computer is unsuccessful, resuming charging for the first resource at the source computer after the time limit expires.

\* \* \* \* \*